US009509735B2

(12) United States Patent
Jiang et al.

(10) Patent No.: US 9,509,735 B2
(45) Date of Patent: Nov. 29, 2016

(54) APPARATUSES AND METHODS FOR SELECTING A TRANSPORT CONTROL MECHANISM

(75) Inventors: Dan Jiang, Shanghai (CN); Mo Li, Shanghai (CN); Jin Qu, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 367 days.

(21) Appl. No.: 13/505,116

(22) PCT Filed: Oct. 21, 2010

(86) PCT No.: PCT/IB2010/054760
§ 371 (c)(1), (2), (4) Date: Apr. 30, 2012

(87) PCT Pub. No.: WO2011/055260
PCT Pub. Date: May 12, 2011

(65) Prior Publication Data

US 2012/0226747 A1 Sep. 6, 2012

(30) Foreign Application Priority Data

Nov. 6, 2009 (CN) .......................... 2009 1 0174488

(51) Int. Cl.
*G06F 15/16* (2006.01)
*H04L 29/06* (2006.01)

(52) U.S. Cl.
CPC ....... *H04L 65/4084* (2013.01); *H04L 65/4092* (2013.01)

(58) Field of Classification Search
None
See application file for complete search history.

(56) References Cited

U.S. PATENT DOCUMENTS

| | | | |
|---|---|---|---|
| 6,757,736 B1 | 6/2004 | Hutchison | |
| 2002/0116499 A1* | 8/2002 | Enns et al. | 709/227 |
| 2003/0112335 A1* | 6/2003 | Strandwitz et al. | 348/211.2 |
| 2006/0059538 A1 | 3/2006 | Lee | |
| 2006/0200570 A1* | 9/2006 | Stirbu | G06F 17/30067 709/230 |
| 2007/0109991 A1* | 5/2007 | Bennett | 370/328 |
| 2007/0169149 A1* | 7/2007 | Jennings et al. | 725/58 |
| 2008/0020776 A1* | 1/2008 | Deshpande et al. | 455/445 |
| 2009/0187974 A1* | 7/2009 | Tulshibagwale | H04L 63/20 726/4 |

FOREIGN PATENT DOCUMENTS

| | | |
|---|---|---|
| CN | 1812574 A | 8/2006 |
| CN | 101466022 A | 6/2009 |

* cited by examiner

*Primary Examiner* — Mohamed Wasel
*Assistant Examiner* — Tsung Wu

(57) ABSTRACT

The present invention proposes an apparatus and a method for selecting a transport control mechanism to be used between a first device (110) and a second device (120). Firstly, a first unit (231) obtains first information indicating the transport control mechanism supported by the first device (210) and second information indicating the transport control mechanism supported by second device (220); then, a second unit (232) selects the transport control mechanism to be used between the first device (210) and the second device (220) on the basis of the first and second information and a preset rule. With the apparatuses and methods provided in the present invention, the problem of how to select the transport control mechanism to be used between the media server and the media client is well solved. Furthermore, by applying the defined messages and the interaction process in IGRS protocols, there is no need for additional messages nor for an additional interaction process.

12 Claims, 4 Drawing Sheets

APPARATUSES AND METHODS FOR SELECTING A TRANSPORT CONTROL MECHANISM

TECHNICAL FIELD

The present invention relates to apparatuses and methods for selecting a transport control mechanism to be used between a first device and a second device, in particular between a media server and a media client.

BACKGROUND OF THE INVENTION

FIG. 1 depicts the overall architecture of an IGRS AV (Intelligent Grouping and Resource Sharing, Audio/Video profile) system, in which 3 logical units are defined, namely the media server 110, the media client 120 and the controller 130. The media server 110 is where content is located and managed, the media client 120 is where content is played and can be either a media player or a media recorder, while the controller 130 is the coordination unit between the media server 110 and the media client 120, and said controller can determine the interaction process of an audio/video application between the media server 110 and the media client 120. In the IGRS AV system, general device/service discovery, service invocation are governed by an IGRS core protocol, while AV specific control (such as multimedia content playback session setup and control) is governed by an IGRS AV protocol, and actual stream transport between the media server 110 and the media client 120 is fully out of band. For the stream transport control, there are two mechanisms: SOAP (Simple Object Access Protocol) based transport control and BCM (Back-Channel Message) based transport control. If the two stream transport control mechanisms are both supported in the media server 110 and the media client 120, a problem that needs to be solved relates to how either one of them is chosen to be operative.

SUMMARY OF THE INVENTION

The present invention proposes a technical solution for selecting a transport control mechanism to be used between a first device and a second device.

According to another embodiment of the present invention, there is provided an apparatus for selecting a transport control mechanism to be used between a first device and a second device, comprising: a first unit for obtaining first information indicating the transport control mechanism supported by the first device and second information indicating the transport control mechanism supported by the second device; and a second unit for selecting the transport control mechanism to be used between the first device and the second device on the basis of the first and second information and a preset rule.

According to an embodiment of the present invention, there is provided a method of selecting a transport control mechanism to be used between a first device and a second device, comprising: obtaining first information indicating the transport control mechanism supported by the first device and second information indicating the transport control mechanism supported by second device; and selecting the transport control mechanism to be used between the first device and the second device on basis of the first and second information and a preset rule.

With the apparatuses and methods provided in the present invention, the problem of how to select the transport control mechanism to be used between the media server and the media client is well solved. Furthermore, by applying the defined messages and interaction process in the IGRS protocols, there is no need for additional messages nor for an additional interaction process to make a selection.

BRIEF DESCRIPTION OF THE DRAWINGS

The above and other objects, characteristics and merits of the present invention will become more apparent from the following detailed description considered in connection with the accompanying drawings, in which.

Figure 1:
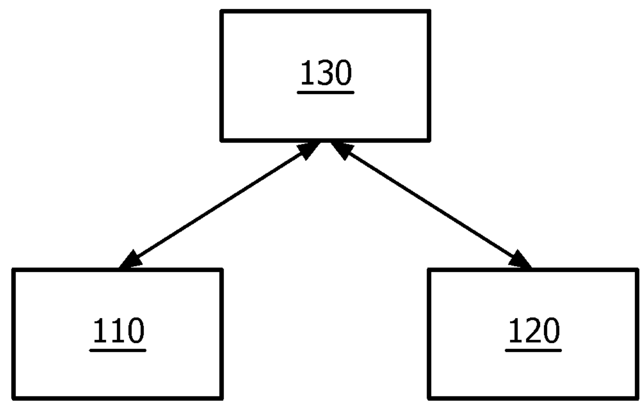
FIG. 1 illustrates the overall architecture of an IGRS AV system, in which 3 logical units are defined, namely the media server 110, the media client 120 and the controller 130.

In the drawings, same or analogous reference numerals refer to same or analogous step features/devices (modules) throughout the Figures.

DETAILED DESCRIPTION OF THE EMBODIMENTS

Hereinafter, embodiments of the present invention are described in detail with reference to the accompanying drawings.

Figure 2:
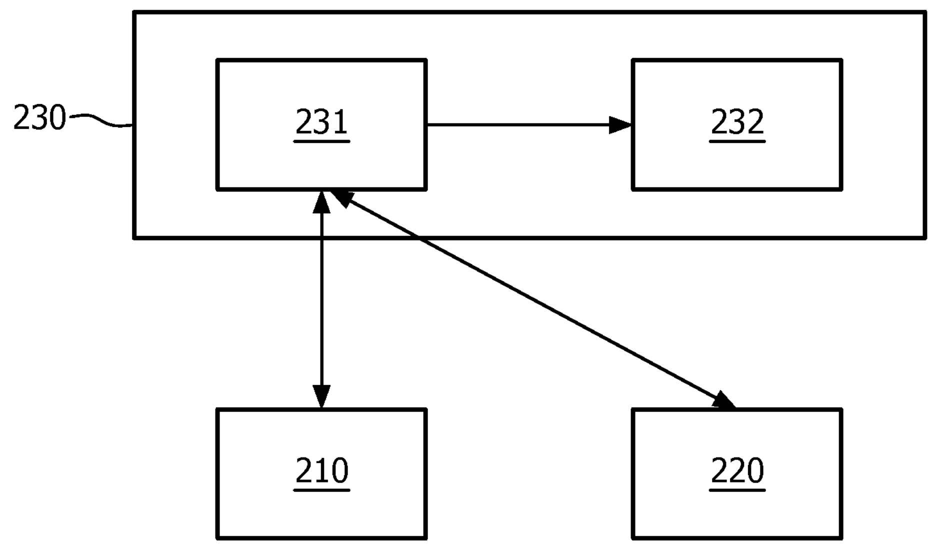
FIG. 2 illustrates a scenario according to an embodiment of the present invention, including a first device 210, a second device 220 and an apparatus 230 for selecting a transport control mechanism to be used between the first device 210 and the second device 220.

FIG. 2 illustrates a scenario according to an embodiment of the present invention, including a first device 210, a second device 220 and an apparatus 230 for selecting a transport control mechanism to be used between the first device 210 and the second device 220. The apparatus 230 includes a first unit 231 and a second unit 232.

Firstly, the first unit 231 obtains first information indicating the transport control mechanism supported by the first device 210 and second information indicating the transport control mechanism supported by the second device 220.

Secondly, the second unit 232 selects the transport control mechanism to be used between the first device and the second device on the basis of the first and second informationtion and a preset rule. In an embodiment, the preset rule is a user's preferential configuration setting. In another embodiment, the preset rule is a default setting.

Figure 3:
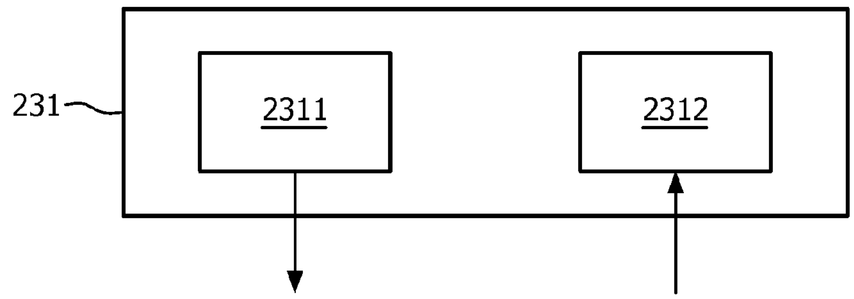
FIG. 3 illustrates a schematic view of a block diagram of the first unit 231 according to an embodiment of the present invention.

In an embodiment, the first unit 231 further comprises a first module 2311 and a second module 2312 for obtaining the first information indicating the transport control mechanism supported by the first device 210, as shown in FIG. 3.

Firstly, the first module 2311 sends a request message requesting at least part of the first information to the first device 210.

When the first device 210 receives the request message, it will respond with a response message comprising at least part of the first information.

Then, the second module 2312 receives a response message comprising at least part of the first information from the first device 210.

If the first device 210 supports several kinds of transport control mechanisms, the first information can be obtained through a single signaling interaction or a plurality of signaling interactions; in each of the plurality of interactions, part of the first information is obtained. The specific form of the request message and the response message for the first information can be varied using different transport control mechanisms supported by the first device 210, which will be illustrated by means of the following examples.

Figure 4:
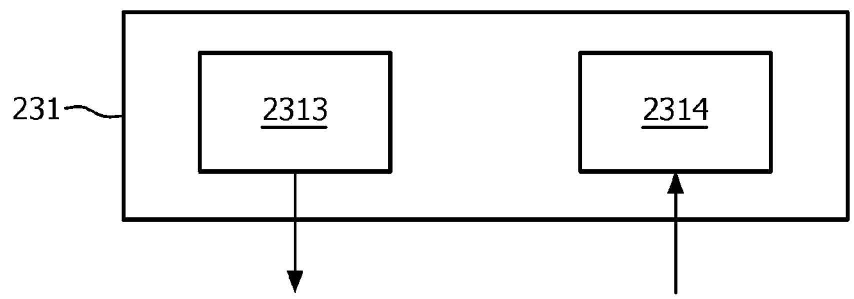
FIG. 4 illustrates a schematic view of a block diagram of the first unit 231 according to another embodiment of the present invention.

In an embodiment, the first unit 231 further comprises a third module 2313 and a fourth module 2314 for obtaining the second information indicating the transport control mechanism supported by the second device 220, as shown in FIG. 4.

Firstly, the third module 2313 sends a request message requesting at least part of the second information to the second device 220.

When the second device 220 receives the request message, it will respond with a response message comprising the at least part of the second information.

Then, the second module 2314 receives a response message comprising the second information from the second device 220.

If the second device 220 supports several kinds of transport control mechanisms, the second information can be obtained through a single signaling interaction or a plurality of signaling interaction; in each of the plurality of interactions, part of the second information is obtained. The specific form of the request message and the response message for the second information can be varied using different transport control mechanisms supported by the second device 210, which will be illustrated by means of the following examples.

It is to be understood that the modules in FIG. 3 and FIG. 4 are just for illustration; the first unit 231 can obtain the first and second information in other ways, such as by just receiving an initiative report from the first and second device, or obtaining the first and second information from another device etc.

Figure 5:
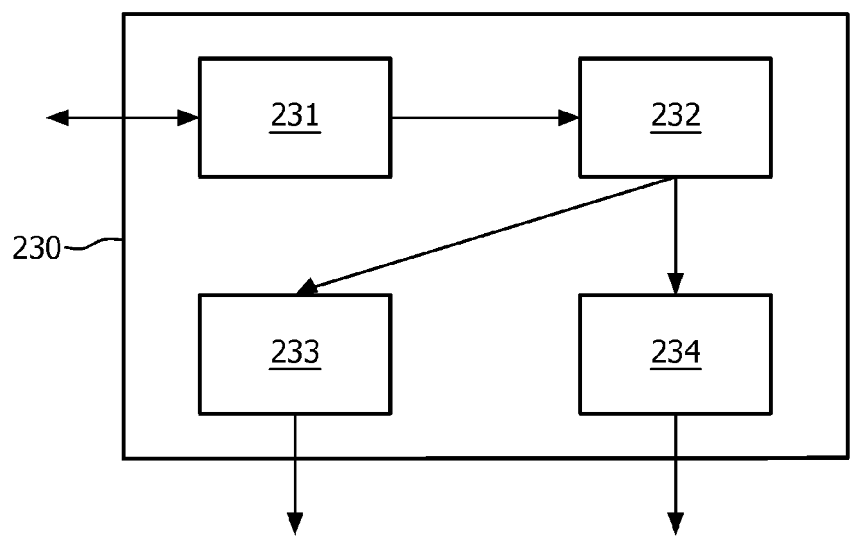
FIG. 5 illustrates a schematic view of a block diagram of the apparatus 230 according to another embodiment of the present invention.

Advantageously, in an embodiment, the apparatus 230 further comprises a third unit 233 and a fourth unit 234, respectively, for notifying the first device 210 and the second device 220 of the selected transport control mechanism selected by the second unit 232, as shown in FIG. 5.

In an embodiment, for an IGRS AV system shown in FIG. 1, the first device 210 can be the media server 110, the second device 220 can be the media client 120. The apparatus 230 can be located in the controller 130, or the controller 130 can achieve the function implemented by the apparatus 230. It is to be understood that the first device 210 can be the media client 120, and the second device 220 can be the media server 110.

If media server 110 supports a SOAP based transport control mechanism, then Content Index Service (CIS), Connection Management Service (CMS), and Media Server Transport Management Service (MSTMS) are realized in media server 110 to perform the transport control of the stream between the media server 110 and the media client 120.

CIS allows the controller 130 to discover the media content and list it on the media server 110, so that the controller 130 can retrieve the content information, including the name, creation date, size, format etc. of media content. This information can be used by the controller 130 to determine whether these contents can be played on the media client 120.

CMS is used to create and manage the connection between the media server 110 and the media client 120. The media server 110 can support and manage several active connections at any time by means of CMS.

The optional MSTMS enables the controller 130 to adjust and control the media stream transport on the media server 110, such as play, pause, stop, seek etc. If this service exists, it means that the "Push" Mode is supported, which means the media server 110 will initiate the media stream transport. Otherwise, it is not supported.

If the media client 120 supports a SOAP based transport control mechanism, then Rendering Management Service (RMS), Connection Management Service (CMS), and Media Client Transport Management Service (MCTMS) are realized in the media client 120 to perform the transport control of the stream between the media server 110 and the media client 120.

RMS allows the controller 130 to control media rendering, such as volume, contrast, brightness etc. Multiple active instances of rendering control can be supported, such as the "picture-in-picture" function in TV. A new RMS instance is created by PrepareForConnection of CMS on the media client 120. This service is only provided by the media client 120.

CMS is used to create and manage the connection between the media server 110 and the media client 120. The media client 120 can support and manage multiple active connections at any time by means of CMS. CMS implementation is the same on both the media client 120 and the media server 110.

The optional MCTMS service enables the controller 130 to adjust and control the transport of a media stream on the media client 120, such as play, pause, stop, seek etc. If this service exists, it means that the "Pull" Mode is supported, which means the media client 120 will initiate the media stream transport. Otherwise, it is not supported.

A Back-Channel is a pipe between the media server 110 and the media client 120 set up for out-of-band transport control. A Back-Channel is set up between a BCM (Back-Channel Message) Server and a Client, and commands, notifications and error messages can be transported in this channel. If media server 110 supports the BCM based transport control mechanism, then the Content Index Service (CIS) and BCM Server are realized by the media server 110 to perform the transport control of a stream between the media server 110 and the media client 120. If media client 120 supports the BCM based transport control, the BCM Client is realized by the media client 120 to perform the transport control of a stream between the media server 110 and the media client 120.

In existing IGRS AV systems, only one transport control mechanism is implemented, being either a SOAP based transport control mechanism or a BCM based transport control mechanism; there is no need to choose. But if both SOAP based and BCM based transport control mechanisms are implemented by the IGRS AV system, the issue that needs to be resolved relates to how either one of them is chosen to be operative.

Figure 6:
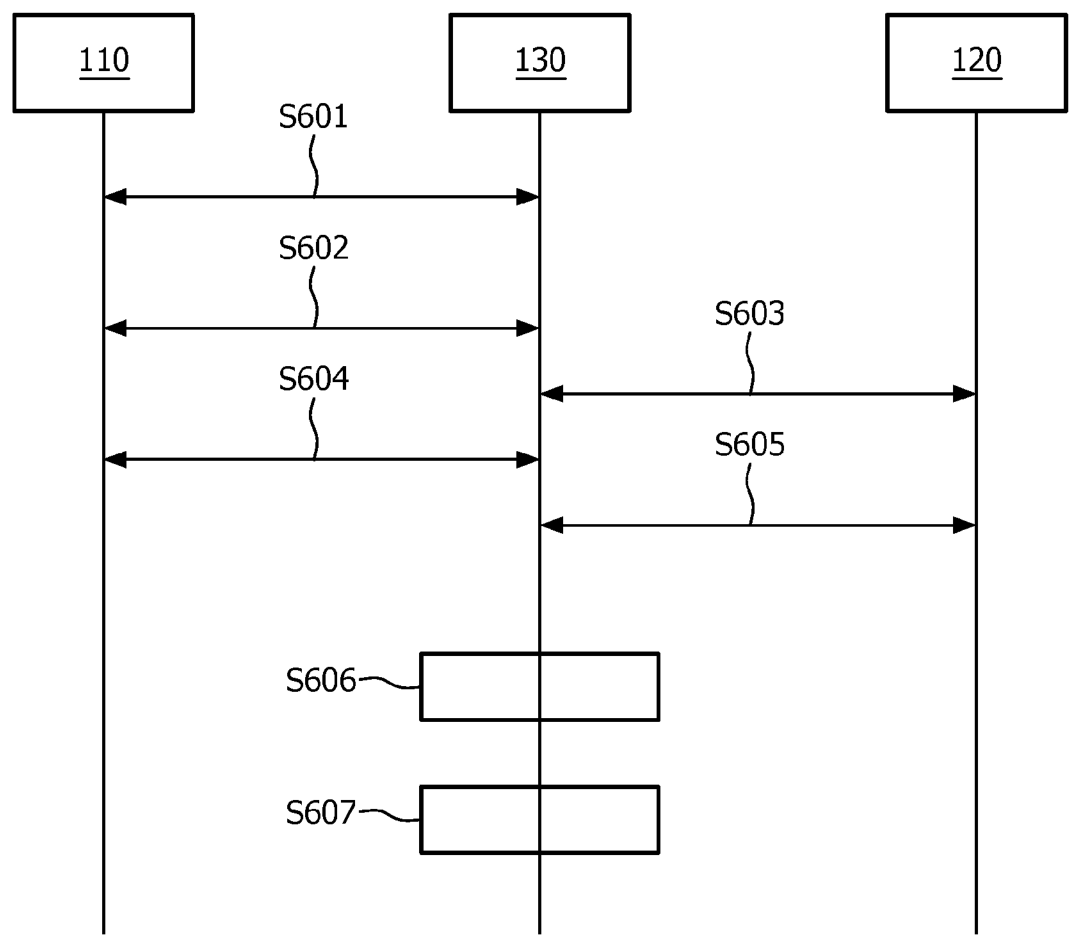
FIG. 6 illustrates an interaction process of selecting a transport control mechanism for an IGRS AV system in a scenario of SOAP based and BCM based transport control mechanisms co-existing according to an embodiment of the present invention.

FIG. 6 shows an interaction process of selecting a transport control mechanism for an IGRS AV system in a scenario of SOAP based and BCM based transport control mechanisms co-existing according to an embodiment of the present invention.

Firstly, in step S601, the controller 130 sends a request message to the media server 110 requesting it to browse the content to be transported and played by the media client 120, and subsequently gets a response message indicating the content from the media server 110, which can be implemented by CIS:Browse defined in the IGRS AV profile standard.

Secondly, in step S602, the controller 130 sends a request message to the media server 110 requesting it to search services provided by the media server 110, and subsequently receives a response message indicating the services provided by the media server 110 from the media server 110, which can be achieved by the SearchServiceRequestOnDevice message and the SearchServiceResponseOnDevice message defined in the IGRS protocol. The SearchServiceResponseOnDevice message comprises a ServiceInfoList comprising MSTMS if a SOAP based transport control mechanism is supported by the media server 110. Alternatively, the controller 130 sends a SearchServiceRequest message to a multicast address 239.255.255.250:1900 to search services provided by a group of devices including the media server 110. The media server 110 responds to the SearchServiceRequest message with a SearchServiceResponse message comprising a ServiceInfoList. The ServiceInfoList will comprise MSTMS if the SOAP based transport control mechanism is supported by the media server 110. Specifically, the step of sending and receiving can be performed by, respectively, the first module 2311 and the second module 2312 of the first unit 231 of the apparatus 230 in the controller 130.

Thirdly, in step S603, the controller 130 sends a request message to the media client 120 requesting it to search services provided by the media client 120, and subsequently receives a response message from the media client 120, which can be achieved by the SearchServiceRequestOnDevice message and the SearchServiceResponseOnDevice message defined in IGRS protocols. The SearchServiceResponseOnDevice message comprises a ServiceInfoList comprising MCTMS if a SOAP based transport control mechanism is supported by the media client 120. Alternatively, the controller 130 sends a SearchServiceRequest message to a multicast address 239.255.255.250:1900 requesting it to search services provided by a group of devices including the media client 120. The media client 120 responds to the SearchServiceRequest message with a SearchServiceResponse message comprising a ServiceInfoList. The ServiceInfoList will comprise MCTMS if the SOAP based transport control mechanism is supported by the media client 120. Specifically, the step of sending and receiving can be performed by, respectively, the third module 2313 and the fourth module 2314 of the first unit 231 of the apparatus 230 in the controller 130.

Then, in step S604, the controller 130 sends a request message to the media server 110 to get the transport protocol information, transport control protocol and media format supported by the media server 110. Then the controller 130 receives a response message comprising the transport protocol information, transport control protocol and media format supported by the media server 110 from the media server 110, which can be achieved by a GetProtocolInfoRequest message and GetProtocolInfoResponse message defined in the IGRS AV profile standard. The GetProtocolInfoResponse message will indicate the transport control protocol is BCM if the BCM based transport control mechanism is supported by the media server 110. Specifically, the step of sending and receiving can be performed by, respectively, the first module 2311 and the second module 2312 of the first unit 231 of the apparatus 230 in the controller 130.

Similarly, in step S605, the controller 130 sends a request message to the media client 120 requesting it to get the transport protocol information, transport control protocol and media format supported by the media client 120. Then, the controller 130 receives a response message comprising the transport protocol information, transport control protocol and media format supported by the media client 120 from media client 120, which can be achieved by a GetProtocolInfoRequest message and GetProtocolInfoResponse message defined in the IGRS AV profile standard. The GetProtocolInfoResponse message will indicate the transport control protocol is BCM if the BCM based transport control mechanism is supported by the media client 120. Specifically, the step of sending and receiving can be performed by, respectively, the third module 2313 and the fourth module 2314 of the first unit 231 of the apparatus 230 in the controller 130.

It is to be understood that FIG. 5 is only an illustration. Step S602 and step S603 can be performed before step S601. Step S602 and step S603 do not have to be performed in a fixed sequence, i.e. step S603 can be performed before step S602 or together with step S602. Step S604 and step S605 do not have to be performed in a fixed sequence, i.e. step S605 can be performed before step S604 or together with step S604.

After getting the transport protocol information and media format supported by, respectively, the media server 110 and the media client 120, in step S606, the controller 130 selects a transport protocol and media format to be used between the media server 110 and the media client 120. For the transport protocol, for instance, if the media server 110 only supports the HTTP protocol, then the media client 120 should also support the HTTP protocol to start the transport. Similarly, for the media format, if the media server 110 supports MPEG2 TS, H.264 for a certain content, and the media client 110 supports MPEG2 TS, WMV, then the controller 130 will select MPEG2 TS as the media format for that content.

For the transport control protocol, i.e. transport control mechanism, in step S607, the second unit 232 of the apparatus 230 in the controller 130 selects a transport control mechanism to be used between the media server 110 and the media client 120 on the basis of the first and second information and a preset rule. The first information indicating the transport control mechanism supported by the media server 110 comprises the information indicating whether the media server 110 supports a SOAP based transport control mechanism or not and the information indicating whether the media server 110 supports a BCM based transport control mechanism or not. The former is obtained by the SearchServiceResponseOnDevice message or the SearchServiceResponse message and the latter is obtained by the GetProtocolInfoResponse message. Similarly, the second information indicating the transport control mechanism supported by the media client 120 comprises the information indicating whether the media client 120 supports a SOAP based transport control mechanism or not and the information indicating whether the media client 120 supports a BCM based transport control mechanism or not. The former is obtained by the SearchServiceResponseOnDevice message or the SearchServiceResponse message and the latter is obtained by the GetProtocolInfoResponse message.

The preset rule can be different, based on different transport control mechanisms supported by the media server 110 and the media client 120. If both the media server 110 and the media client 120 support the SOAP based and BCM based transport control mechanisms, the preset rule can be a default setting or a user's preferential configuration setting. For example, the default setting can be a BCM based transport control mechanism. The user's preferential configuration setting can be also a BCM based transport control mechanism. If both a default setting and a user's preferential configuration setting exist, the preset rule can be the user's preferential configuration setting.

If the media client 120 only supports one kind of transport control mechanism, while the media server 110 supports two kinds of transport control mechanisms, then the preset rule selects the kind of transport control mechanism supported by the media client 120. The selection is similar when the media server 110 only supports one kind of transport control mechanism while the media client 120 supports two kinds of transport control mechanisms.

It is to be understood that step S606 and step S607 do not have to be performed in a fixed sequence, i.e. step S607 can be performed before step S606 or together with step S606.

When the selection is done, the controller 130 can further notify the media server 110 and the media client 120 of the selected transport control mechanism. This can be achieved by an additional signaling interaction process, or by the defined signaling interaction process in the IGRS AV profile standard. For example, if a SOAP based transport control mechanism is selected, then the controller 130 sends a CMS:PrepareForConnnectionRequest message to, respectively, the media server 110 and the media client 120. When the media server 110 and the media client 120 receive the CMS:PrepareForConnnectionRequest message, they will realize that the SOAP based transport control protocol is selected to control the stream transport between them. Then MCTMS and MSTMS will be invoked by, respectively, the media client 120 and the media server 110 to realize the transport control between the media client 120 and the media server 110.

In the case of the controller 130 and the media client 120 being implemented together in a physical device, the interaction process in FIG. 6 between the controller 130 and the media client 120 can be omitted. In such a situation, if a BCM based transport control mechanism is selected, then the controller 130 sends a BCM:Play message to the media server 110. When the media server 110 receives the BCM: Play message, it will realize that the BCM based transport control protocol is selected to control the stream transport. Then BCM client and BCM server are invoked to realize the transport control between, respectively, the media client 120 and the media server 110.

Similarly, in the case of the controller 130 and the media server 110 being implemented together in a physical device, the interaction process in FIG. 6 between the controller 130 and the media server 110 can also be omitted.

From FIG. 6, it can be seen that the request message requesting at least part of the first or second information and the response message comprising the at least part of the first or second information can be implemented by the defined messages in the IGRS AV protocols. No additional message type and additional interaction process are needed for the controller 130 to obtain the first and second information and to notify the media client 120 and the media server 110 of the selected transport control protocol.

Figure 7:
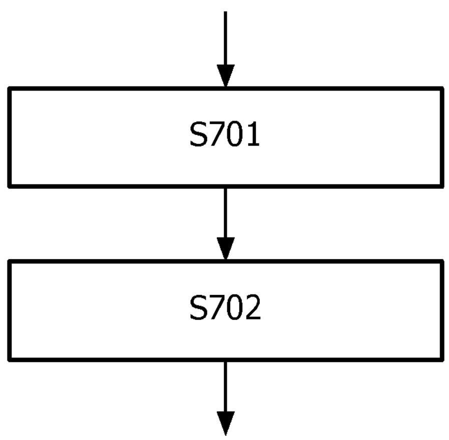
FIG. 7 illustrates a flowchart of selecting a transport control mechanism to be used between a first device 110 and a second device 120 according to another embodiment of the present invention.

FIG. 7 shows a flowchart of selecting a transport control mechanism to be used between a first device 110 and a second device 120.

Firstly, in step S701, first information is obtained indicating the transport control mechanism supported by the first device 210 and second information is obtained indicating the transport control mechanism supported by the second device 220. In an embodiment, step S701 can be performed by the first unit 231 of the apparatus 230.

Secondly, in step S702, the transport control mechanism is selected that is to be used between the first device and the second device on the basis of the first and second information and a preset rule. In an embodiment, the step S702 can be performed by the second unit 232 of the apparatus 230.

In an embodiment, the preset rule is a user's preferential configuration setting. In another embodiment, the preset rule is a default setting.

Figure 8:
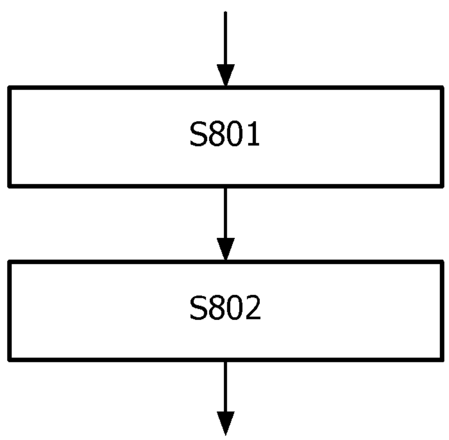
FIG. 8 illustrates a flowchart of the substeps of step S701 in FIG. 7 according to an embodiment of the present invention.

In an embodiment, the step S701 can further comprise two substeps for obtaining the first information indicating the transport control mechanism supported by the first device 210, as shown in FIG. 8.

Firstly, in step S801, a request message requesting at least part of the first information is sent to the first device 210. In one embodiment, the step S801 can be performed by first module 2311 of the first unit 231 of the apparatus 230.

When the first device 210 receives the request message, it will respond with a response message comprising the at least part of the first information.

Then, in step S802, a response message is received comprising at least part of the first information from the first device 210. In an embodiment, the step S802 can be performed by second module 2312 of the first unit 231 of the apparatus 230.

If the first device 210 supports several kinds of transport control mechanisms, the first information can be obtained through a single signaling interaction or a plurality of signaling interactions, wherein in each of the plurality of interactions, part of the first information is obtained, i.e. the substeps S801 and S802 can be performed several times to obtain all of the first information.

Figure 9:
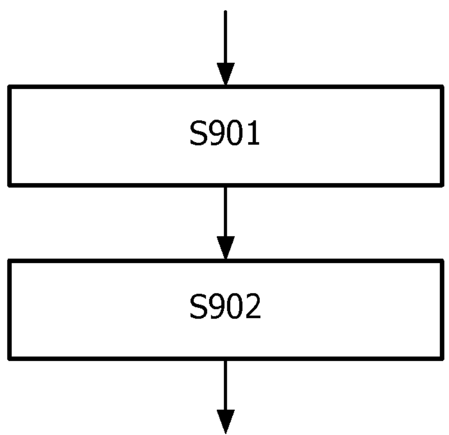
FIG. 9 illustrates a flowchart of the substeps of step S701 in FIG. 7 according to an embodiment of the present invention.

In an embodiment, the step S701 may further comprise another two substeps for obtaining the second information indicating the transport control mechanism supported by the second device 220, as shown in FIG. 9.

Firstly, in step S901, a request message requesting at least part of the second information is sent to the first device 220. In an embodiment, the step S901 can be performed by the third module 2313 of the first unit 231 of the apparatus 230.

When the second device 220 receives the request message, it will respond with a response message comprising the at least part of the second information.

Then, in step S902, a response message comprising the second information is received from the second device 220. In an embodiment, the step S902 can be performed by fourth module 2314 of the first unit 231 of the apparatus 230.

If the second device 220 supports several kinds of transport control mechanisms, the second information can be obtained through a single signaling interaction or a plurality of signaling interactions, wherein in each of the plurality of interactions, part of the second information is obtained, i.e. the substeps S901 and S902 can be performed several times to obtain all of the second information.

It is to be understood that the substeps in FIG. 8 and FIG. 9 are just for illustration; the first and second information can be obtained in other ways such as by just receiving an initiative report from the first and second device, or obtaining the first and second information from another device, etc.

Advantageously, in an embodiment, the flowchart in FIG. 7 can further comprise a step of notifying, respectively, the first device 210 and the second device 220 of the selected transport control mechanism selected by the second unit 232, which can be performed by the third unit 233 and the fourth unit 234 of the apparatus 230 in one embodiment.

The function of the apparatus 230 and the flowcharts in FIG. 7 to FIG. 9 are fully described in the above paragraphs. It should be understood that the application of the apparatus 230 and the flowcharts in FIG. 7 to FIG. 9 is not limited to an IGRS AV system. For other scenarios of a transport control mechanism to be selected, the apparatus 230 and the flowcharts in FIG. 7 to FIG. 9 are also applicable.

It is further to be understood that the apparatus 230 is described in terms of its function only. The apparatus 230 or each unit therein, such as the first unit 231 and/or the second unit 232 etc., can be implemented by hardware or a combination of software and hardware. For example, they could be implemented by a processor linked to a memory storing the instruction code for implementing the function of the first unit 231 and/or the second unit 232. Some of the modules and/or the units of the apparatus 230 can share the same physical module upon their implementation. For example, the third module 2313 and the fifth module 2315 can share the same physical module.

It should be noted that the above-described embodiment is for the purpose of illustration only and not to be construed as a limitation of the invention. All such modifications which do not depart from the spirit of the invention are intended to be included within the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The use of the words first, second and third, et cetera, does not indicate any ordering. These words are to be interpreted as names.

What is claimed is:

1. An apparatus for selecting a stream transport control mechanism to be used between a first device and a second device, comprising:

a first unit for obtaining first information indicating a stream transport control mechanism supported by the first device and second information indicating a stream transport control mechanism supported by the second device, wherein the stream transport control mechanism comprises both a Simple Object Access Protocol (SOAP) based transport control mechanism and a Back-Channel Message (BCM) based transport control mechanism; and a second unit for selecting the stream transport control mechanism to be used between the first device and the second device on the basis of the obtained first information, the obtained second information, and a preset rule, wherein the preset rule is different as determined based on (i) stream transport control mechanisms supported by the first device as indicated via the obtained first information and (ii) stream transport control mechanisms supported by the second device as indicated via the obtained second information, said second unit selecting only a single mechanism, either SOAP or BCM, to be operative in response to both SOAP and BCM being supported by both the first device and the second device.

2. The apparatus according to claim 1, wherein the preset rule further comprises a user's preferential configuration setting.

3. The apparatus according to claim 1, wherein the preset rule further comprises a default setting.

4. The apparatus according to claim 1, wherein the first unit comprises:

a first module configured to send a request message requesting at least part of the first information to the first device; and a second module configured to receive a response message that comprises at least part of the first information from the first device.

5. The apparatus according to claim 1, wherein the first unit further comprises:

a third module configured to send a request message requesting at least part of the second information to the second device; and a fourth module configured to receive a response message that comprises at least part of the second information from the second device.

6. The apparatus according to claim 1, further comprising:

a third unit configured to notify the first device of the selected stream transport control mechanism; and a fourth unit configured to notify the second device of the selected stream transport control mechanism.

7. A method of selecting a stream transport control mechanism to be used between a first device and a second device, comprising:

obtaining first information indicating a stream transport control mechanism supported by the first device and second information indicating a stream transport control mechanism supported by the second device, wherein the stream transport control mechanism comprises both a Simple Object Access Protocol (SOAP) based transport control mechanism and a Back-Channel Message (BCM) based transport control mechanism; and selecting the stream transport control mechanism to be used between the first device and the second device on the basis of the first obtained information, the obtained second information, and a preset rule, wherein the preset rule is different as determined based on (i) stream transport control mechanisms supported by the first device as indicated via the obtained first information and (ii) stream transport control mechanisms supported by the second device as indicated via the obtained second information, selecting only a single mechanism, either SOAP or BCM, to be operative in response to both SOAP and BCM being supported by both the first device and the second device.

8. The method according to claim 7, wherein the preset rule further comprises a user's preferential configuration setting.

9. The method according to claim 7, wherein the preset rule further comprises a default setting.

10. The method according to claim 7, wherein the step of obtaining the first information comprises:

sending a request message requesting at least part of the first information to the first device; and receiving a response message that comprises at east part of the first information from the first device.

11. The method according to claim 7, wherein the step of obtaining the second information comprises:

sending a request message requesting at least part of the second information to the second device; and receiving a response message that comprises at least part of the second information from the second device.

12. The method according to claim 7, further comprising the following step:

notifying the first device and the second device of the selected stream transport control mechanism.

* * * * *